US005661253A

United States Patent [19]

Aoki

[11] Patent Number: 5,661,253

[45] Date of Patent: Aug. 26, 1997

[54] CONTROL APPARATUS AND ELECTRONIC MUSICAL INSTRUMENT USING THE SAME

[75] Inventor: Eiichiro Aoki, Hamamatsu, Japan

[73] Assignee: Yamaha Corporation, Japan

[21] Appl. No.: 606,059

[22] Filed: Oct. 30, 1990

[30] Foreign Application Priority Data

Nov. 1, 1989 [JP] Japan .................................. 1-282941
Nov. 1, 1989 [JP] Japan .................................. 1-282942

[51] Int. Cl.[6] .................................................. G01P 3/00

[52] U.S. Cl. .............................. 84/658; 84/662; 84/670; 84/718; 84/743

[58] Field of Search ............................ 84/600, 626, 627, 84/629, 631, 644, 658, 662, 664, 670, 718, 743, 737; 200/6 A

[56] References Cited

U.S. PATENT DOCUMENTS

| | | | |
|---|---|---|---|
| 3,056,867 | 10/1962 | Eitel | 200/6 A |
| 3,723,687 | 3/1973 | Adkinson | 200/6 A X |
| 4,130,043 | 12/1978 | Niimi . | |
| 4,546,245 | 10/1985 | Cooper et al. | 84/DIG. 19 X |
| 4,805,510 | 2/1989 | De Dianous . | |
| 4,932,304 | 6/1990 | Franzmann | 84/671 |
| 4,962,448 | 10/1990 | DeMaio et al. | 200/6 A X |
| 4,984,276 | 1/1991 | Smith | 84/630 X |
| 5,038,662 | 8/1991 | Ho | 84/723 |
| 5,107,080 | 4/1992 | Rosen | 200/6 A |
| 5,113,743 | 5/1992 | Higashi | 84/622 |
| 5,117,730 | 6/1992 | Yamauchi | 84/723 |
| 5,125,313 | 6/1992 | Hiyoshi et al. | 84/600 |
| 5,131,310 | 7/1992 | Kunimoto | 84/604 |
| 5,140,313 | 8/1992 | Wen | 200/6 A X |
| 5,149,904 | 9/1992 | Kamiya et al. | 84/723 |

FOREIGN PATENT DOCUMENTS

| | | |
|---|---|---|
| 5230417 | 3/1977 | Japan . |
| 63-40199 | 2/1988 | Japan . |

*Primary Examiner*—William M. Shoop, Jr.
*Assistant Examiner*—Jeffrey W. Donels
*Attorney, Agent, or Firm*—Graham & James LLP

[57] ABSTRACT

A control apparatus comprises a rod-like member having a gripping portion at its distal end, a support member for supporting the rod-like member, the gripping portion being movable along an axial direction of the rod-like member, and moving amount detectors for detecting moving amounts of the gripping portion. The control apparatus inputs a control signal to a control object on the basis of a detection value of the moving amount detectors. An electronic musical instrument has a control apparatus as a performance operation member for controlling electronic tone generation parameters in correspondence with a performance function, and a sound source for generating an electronic tone on the basis of inputs from a keyboard and the performance operation member.

18 Claims, 18 Drawing Sheets

CHTBL

| | |
|---|---|
| CHF(0) | CHKCD(0) |
| CHF(1) | CHKCD(1) |
| CHF(2) | CHKCD(2) |
| CHF(3) | CHKCD(3) |

CONTROL APPARATUS AND ELECTRONIC MUSICAL INSTRUMENT USING THE SAME

BACKGROUND OF THE INVENTION

1. Field of the Invention

The present invention relates to a control apparatus, especially, the mechanical construction thereof, for an electronic musical instrument and other electronic or electrical apparatuses, and to an electronic musical instrument, especially, an electronic musical instrument for generating an electronic tone corresponding to a bowed instrument, which uses the control apparatus as an input apparatus for controlling electronic tone generation parameter.

2. Prior Art

In an electronic apparatus, especially, in an electronic musical instrument, an input for controlling the operation thereof is made from a switch operation or a key depression and release operation on a keyboard. Therefore, the keyboard or switches on an operation panel constitute an input apparatus.

A conventional input apparatus comprising a keyboard, push buttons, or various switches has separate and independent operation sections, resulting in poor operability or operation feeling, or causing operation errors.

An electronic musical instrument which generates bowed instrument tones such as violin tones comprises a physical sound source for generating an electronic tone obtained by physically approximating a mechanical vibration of a string in correspondence with a movement of a fricative contact between the string and a bow. In such an electronic musical instrument, performance function parameters such as a bow pressure upon pressing of a string of a bowed instrument, a bow velocity, a bow position, and the like are input from a keyboard consisting of a plurality of keys. More specifically, a key code representing a scale, a magnitude of a tone, its length, and the like are input by key depression or release touches or timings on the keyboard, and operations of other switches on the keyboard.

Since the conventional electronic musical instrument controls a performance function upon key depression/release operations on the keyboard, it suffers from a quite different performance feeling although it can generate a performance tone approximate to that of a bowed instrument which generates a musical tone by means of a bow and strings. For this reason, a demand has arisen for an electronic musical instrument which can enjoy a performance state similar to that of a bowed instrument such as a violin and be played just like an acoustic instrument.

SUMMARY OF THE INVENTION

The present invention has been made in consideration of the above situation, and has as its first object to provide a control apparatus which has improved operability and can input a control signal to a plurality of control objects by operating one operation member.

It is the second object of the present invention to provide an electronic musical instrument which makes a control input of a performance function of a bowed instrument not only by a keyboard but also by a performance operation member similar to a movement of a bow.

Arrangement of First Aspect

In order to achieve the first object, a control apparatus according to the first aspect of the present invention comprises a rod-like member having a gripping portion at its distal end, a support member for supporting the rod-like member, the gripping portion being movable along an axial direction of the rod-like member, and a moving amount detection means for detecting a moving amount of the gripping portion. The control apparatus inputs a control signal to a control object on the basis of a detection value of the moving amount detection means.

The rod-like member comprises a structure extending through the support member to be movable in the axial direction or a telescopically extendible multi-stage pipe arranged on one side of the support member.

The gripping portion is rotatable about the rod-like member with respect to the support member, and the control apparatus comprises a rotational amount detection means for detecting a rotational amount of the gripping portion with respect to the support member.

The gripping portion preferably comprises a gripping pressure detection means.

The gripping portion comprises a detection means for detecting a pressing force for pressing the support member in a direction perpendicular to an apparatus installation surface in place of the gripping pressure detection means, or in addition to it.

The support member preferably comprises two angle detection means for swingably and rotatably supporting the rod-like member on the apparatus installation surface, and respectively detecting rotational angles in horizontal and vertical planes of the rod-like member.

Operation

Upon operation of the gripping portion of an input operation element, changes in axial movement, rotation about an axis, a gripping pressure, and rotational angles in the horizontal and vertical planes of the gripping portion upon swingable rotation of the operation element support member are detected, and can be used as control inputs.

Arrangement of Second Aspect

In order to achieve the second object, an electronic musical instrument according to the second aspect of the present invention comprises a performance operation member for controlling electronic tone generation parameters in correspondence with a performance function, and a sound source for generating an electronic tone on the basis of inputs from a keyboard and the performance operation member. The performance operation member comprises a rod-like member having a gripping portion at its distal end. The gripping portion is movable along its axial direction with respect to a support member for the rod-like member.

The performance operation member generates control signals according to a bow position, a bow velocity, and a bow pressure of a bowed instrument.

The support member of the rod-like member rotatably supports the rod-like member about an axis, and also swingably and rotatably supports the rod-like member with respect to an instrument main body.

The performance operation member comprises detection means for respectively detecting a rotational amount about an axis and an axial moving amount of the rod-like member, and a gripping pressure of the gripping portion, or a vertical pressing force of the support member, and detection values respectively correspond to the bow position, bow velocity, and bow pressure of the bowed instrument.

The sound source comprises a delay circuit for determining a delay time corresponding to the bow position, a low-pass filter for determining a tone color, an attenuator for determining an attenuation (decay) rate of a tone, and a function generator for generating a nonlinear function of predetermined hysteresis characteristics according to a bow pressure and a bow velocity.

The sound source is arranged to make the following control operations. That is, the delay time is controlled on the basis of the detection value of the rotational amount about the axis of the rod-like member. The attenuator is controlled on the basis of one of the detection values of angles in the horizontal and vertical planes of the rod-like member, and the low-pass filter is controlled on the basis of the other detection value. The function generator is controlled on the basis of the detection values of the axial moving amount and gripping pressure of the gripping portion of the rod-like member.

Input operations of musical tone control parameters for the sound source are performed as follows. That is, a key code is input at the keyboard, and parameters corresponding to the bow pressure, bow position, and the bow velocity are input by the rod-like performance operation member which is moved like a bow.

Operation

The gripping portion at the distal end of the rod-like operation member is rotatable about and axially movable along the support member of the operation member. In addition, the support member swingably and rotatably supports the operation member with respect to the instrument main body. Therefore, the operation member can be moved like a bow. Rotation about the axis, axial movement, and the gripping pressure (or pressing force) of the operation member are respectively detected, and are input to the sound source as musical tone control parameters after arithmetic processing. Furthermore, angles in the horizontal and vertical planes of the operation member are detected, and are input to the sound source as musical tone control parameters after arithmetic processing.

DETAILED DESCRIPTION OF THE PREFERRED EMBODIMENTS

The preferred embodiments of the present invention will be described hereinafter with reference to the accompanying drawings.

Figure 1:
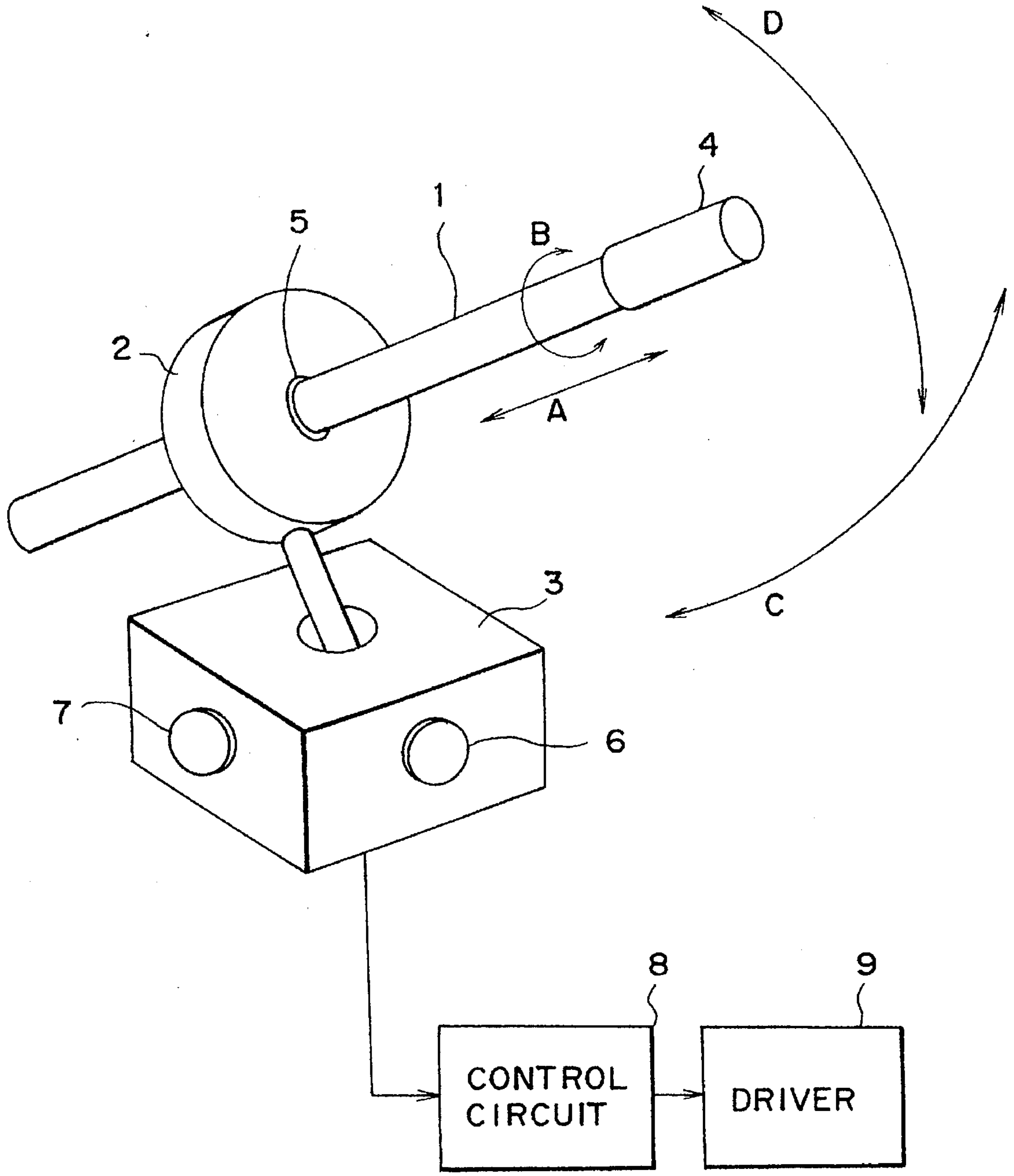
FIG. 1 is a perspective view showing an outer appearance of an input operation member which is a control apparatus according to the present invention.

FIG. 1 is a perspective view of an input operation member, i.e., operation apparatus, according to the present invention. An operation rod 1 comprising an elongated rod-like member is mounted to extend through a support member 2. The support member 2 is swingably and rotatably supported on a Joystick housing 3 fixed on an instrument main body (not shown). A gripping portion 4 serving as an operation grip is provided at the distal end portion of the operation rod 1.

The operation rod 1 is reciprocally movable along a longitudinal axis with respect to the support member 2, as indicated by an arrow A, and is rotatable about the longitudinal axis, as indicated by an arrow B. A ring 5 (to be described later) for detecting a rotational amount and a moving amount (reciprocal amount) of the operation rod is arranged on a portion of the operation rod 1, which portion is inserted in the support member.

The operation rod 1 is rotatable by a joystick mechanism (not shown) in the housing 3 in an azimuth direction in a horizontal plane, as indicated by an arrow C, and is rotatable in a direction of an elevation angle in a vertical plane, as indicated by an arrow D. An azimuth angle (to be referred to as an angle 1 hereinafter) as an angle in the horizontal plane is detected by an angle 1 detector 6, and an elevation angle (to be referred to as an angle 2 hereinafter) as an angle in the vertical plane is detected by an angle 2 detector 7.

A pressure sensor (not shown) for detecting a gripping pressure is provided to the gripping portion 4 of the operation rod 1.

The detection values of the rotational amount, moving amount, stereoscopic angles (angles 1 and 2), and gripping pressure are input to a control circuit 8, and are then subjected to predetermined arithmetic processing.

Thereafter, these detection values are input to an electronic driver (an electronic sound source circuit in this embodiment) 9.

Figure 2A:
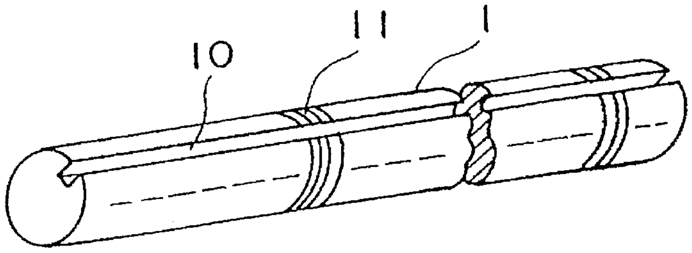
FIGS. 2(*a*) and 2(*b*) are perspective view of an operation rod of an input operation member shown in FIG. 1, and an explanatory view of a surface pattern, respectively.
Figure 2B:
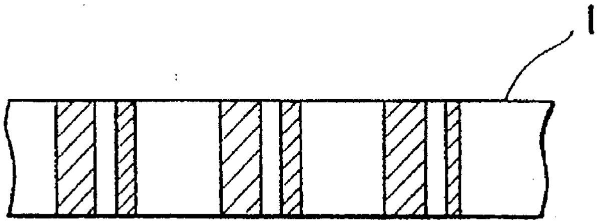

FIGS. 2(*a*) and 2(*b*) show the operation rod 1 in detail. A key groove 10 is formed on the operation rod 1 along its longitudinal axis. A bar code 11 consisting of repetitive patterns is formed on the surface of the operation rod 1. In the bar code 11, a set of thick and thin patterns are successively formed, as shown in FIG. 2(*b*). With this bar code, a moving direction of the operation rod 1 can be discriminated, and by counting the number of patterns, the position of the operation rod 1 can be detected. The bar code 11 may comprise black-and-white patterns to be detected by an amount of reflected light, or may comprise magnetic patterns to be magnetically detected.

The reciprocal operation of the operation rod 1 can be detected by an optical linear encoder means for detecting an optical pattern using light-emitting and light-receiving diodes, a magnetic linear encoder means for detecting a magnetic pattern using a magnetic head, or a rotary encoder for generating two different phases and discriminating a normal/reverse rotation. In this case, upon axial movement of the operation rod, the rotary encoder may be rotated by a frictional force between itself and the operation rod, or a rack is formed on the operation rod and a pinion is formed on the encoder, so that the rotary encoder can be rotated by a rack & pinion gear mechanism.

Figure 3A:
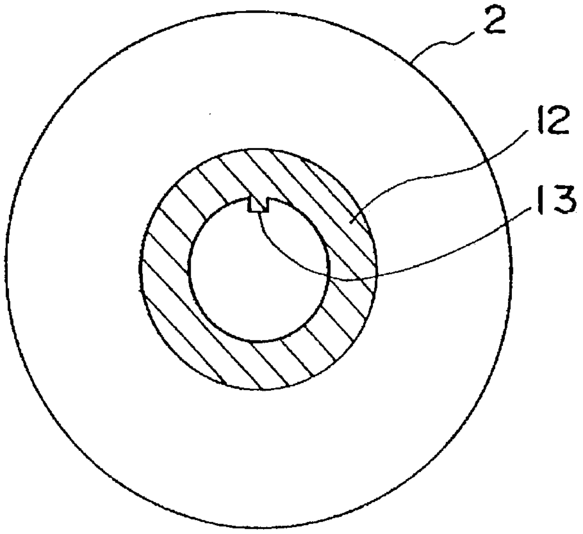
FIGS. 3(*a*) and 3(*b*) are respectively a front view and a sectional view of a operation rod support member of the input operation member shown in FIG. 1.
Figure 3B:
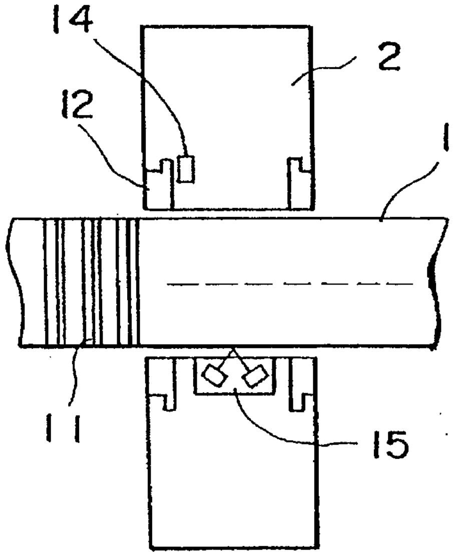

FIGS. 3(*a*) and 3(*b*) show in detail a through hole portion formed in the center of the support member 2 for the operation rod 1. A ring 12 having a key 13 is fitted in the central through hole. The key 13 of the ring 12 is fitted in the key groove 10 of the operation rod 1, so that the operation rod 1 is slidable in the axial direction and is non-rotatable with respect to the ring 12.

A magnetic pattern for detecting a rotational angle of the ring 12 is formed on the surface of the ring 12. A magnetic sensor 14 for detecting the magnetic pattern of the ring 12 and a bar code sensor 15 for detecting the bar code 11 of the operation rod 1 are provided in the support member 2. The rotational angle of the ring 12 may be optically detected using a black-and-white pattern having different amounts of reflected light by light-emitting and light-receiving diodes in place of the magnetic pattern.

Figure 4A:
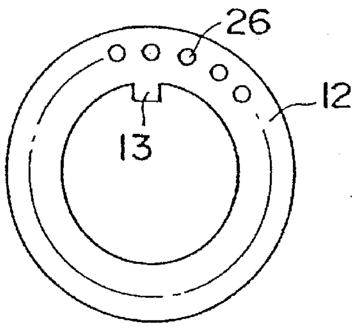
FIGS. 4(*a*) and 4(*b*) are respectively explanatory views of a mechanism for detecting a rotational angle of a operation rod.
Figure 4B:
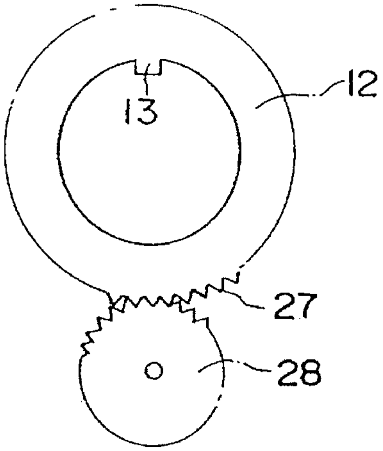

FIGS. 4(*a*) and 4(*b*) show other detection means for detecting the rotational angle of the ring 12, i.e., the rotational angle of the operation rod 1. FIG. 4(*a*) shows a mechanism wherein through holes 26 are successively formed in the ring 12, and the number of through hole pulses is counted using light-emitting and light-receiving diodes to detect a rotational angle. FIG. 4(*b*) shows a mechanism wherein a gear is formed on the ring 12, and is meshed with a gear of a rotary volume 28, so that the rotary volume 28 is rotated to detect a rotational angle based on a change in resistance.

Figure 5A:
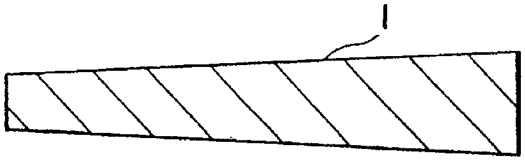
FIGS. 5(*a*) and 5(*b*) are sectional views of the operation rods.
Figure 5B:
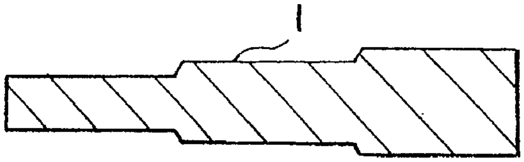
Figure 6A:
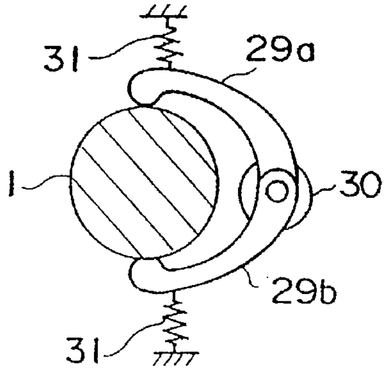
FIGS. 6(*a*) and 6(*b*) are explanatory views of a position detection means when the operation rod shown in FIG. 5(*a*) is used.
Figure 6B:
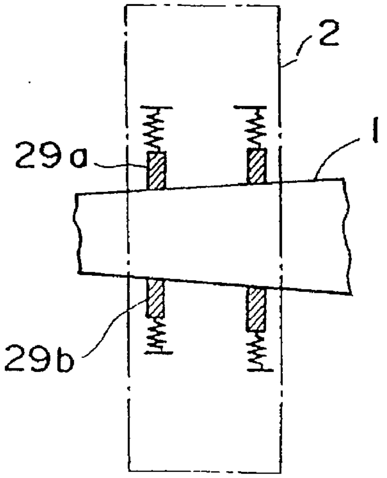

FIGS. 5(*a*) to 6(*b*) show other means for detecting axial movement of the operation rod 1.

In FIG. 5(*a*), the operation rod 1 is tapered, and in FIG. 5(*b*), the thickness of the operation rod 1 is changed stepwise. Such an operation rod 1 is inserted between a pair of detection segments 29*a* and 29*b* arranged in the support member 2, so that the detection segments 29*a* and 29*b* which are pressed against the operation rod by springs 31 are rotated in correspondence with the outer diameter of the operation rod 1, and an angle sensor 30 detects this to detect movement of the operation rod. In place of the angle sensor 30, a pressure sensor which is pressed against the outer surface of the operation rod may be used to detect movement of the operation rod as a change in pressure.

Figure 7:
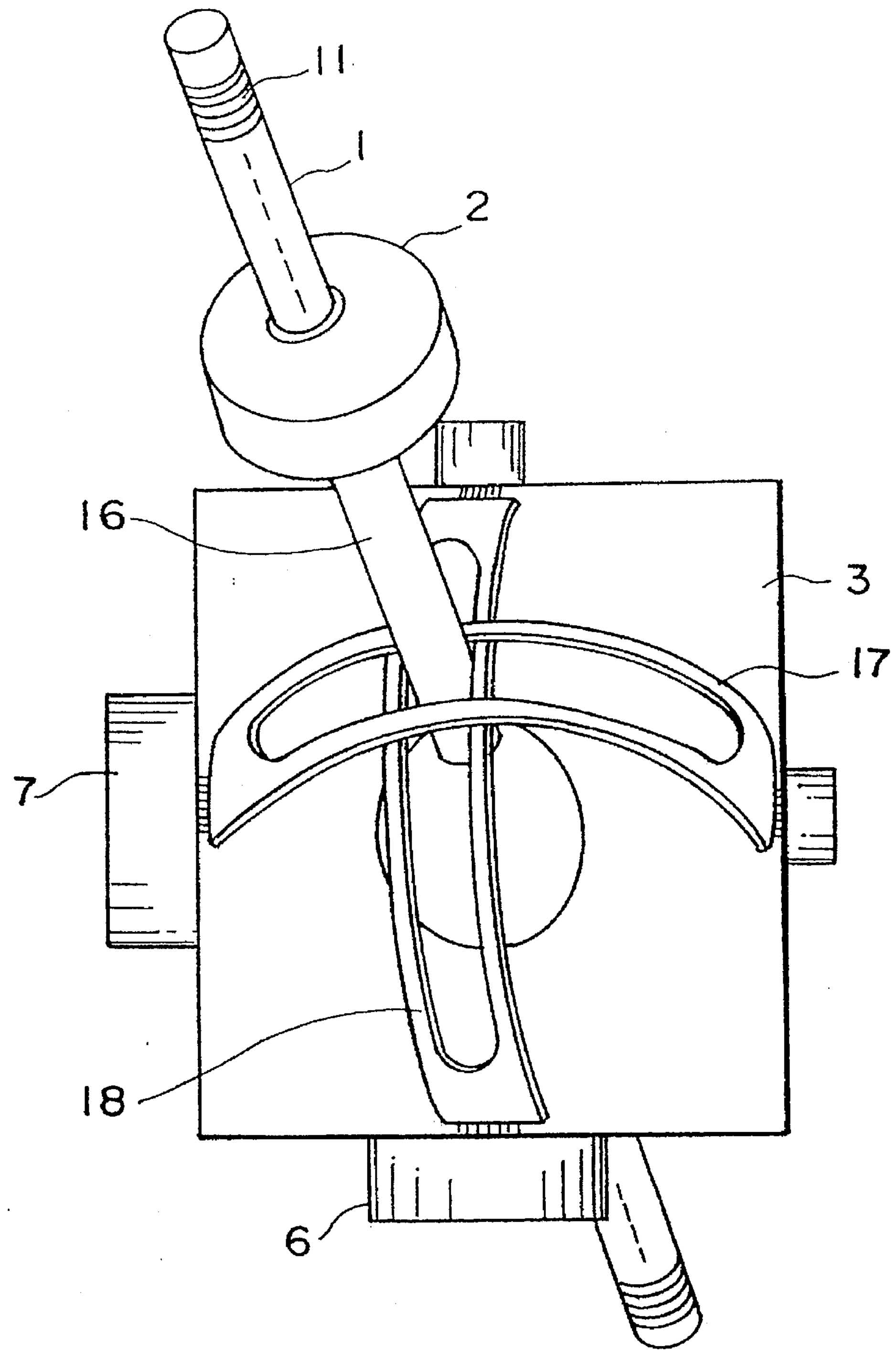
FIG. 7 is an explanatory view of a joystick mechanism of an input operation member according to the present invention.

FIG. 7 shows a Joystick mechanism used in the present invention. The operation rod 1 extending through the support member 2 as described above is inserted in and held by a pipe 16 which is swingably and rotatably supported on the housing 3. The pipe 16 is inserted in a crossing portion of elongated holes of support segments 17 and 18 each of which is rotatable in one of directions of the above-mentioned angles 1 and 2. The pipe 16 rotates the angle 1 and 2 detectors 6 and 7 comprising rotary volumes through these support segments 17 and 18, thereby detecting the angles 1 and 2 of the operation rod 1.

Figure 8:
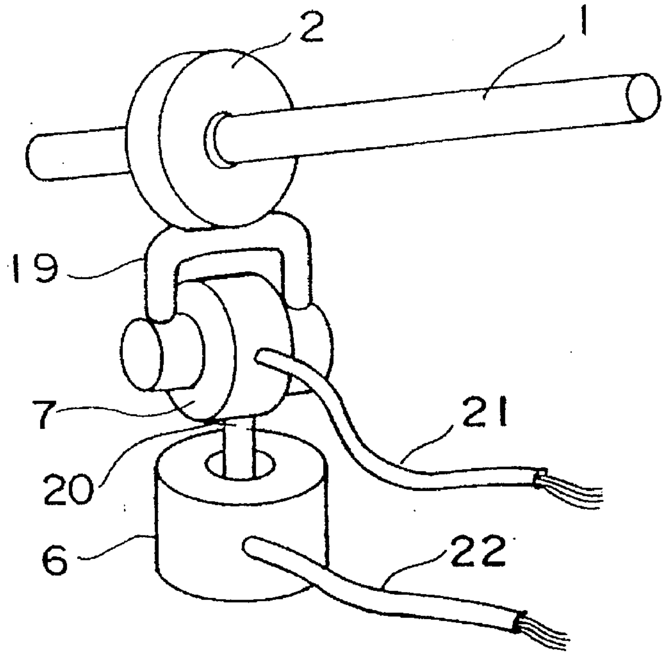
FIGS. 8 and 9 are perspective views showing different joystick mechanism according to the present invention.

FIG. 8 is a perspective view showing another embodiment of an input operation member according to the present invention. In this embodiment, a support member 2 of an operation rod i is mounted on an angle 2 sensor 7 comprising a rotary volume via a support arm 19. The angle 2 sensor 7 is fixed on a detection shaft 20 of an angle 1 sensor 6. Reference numerals 21 and 22 are signal cables for outputting detection signals of angles 1 and 2 based on changes in resistance. Other arrangements, operations, and effects of this embodiment are the same as those in the above embodiment.

Figure 9:
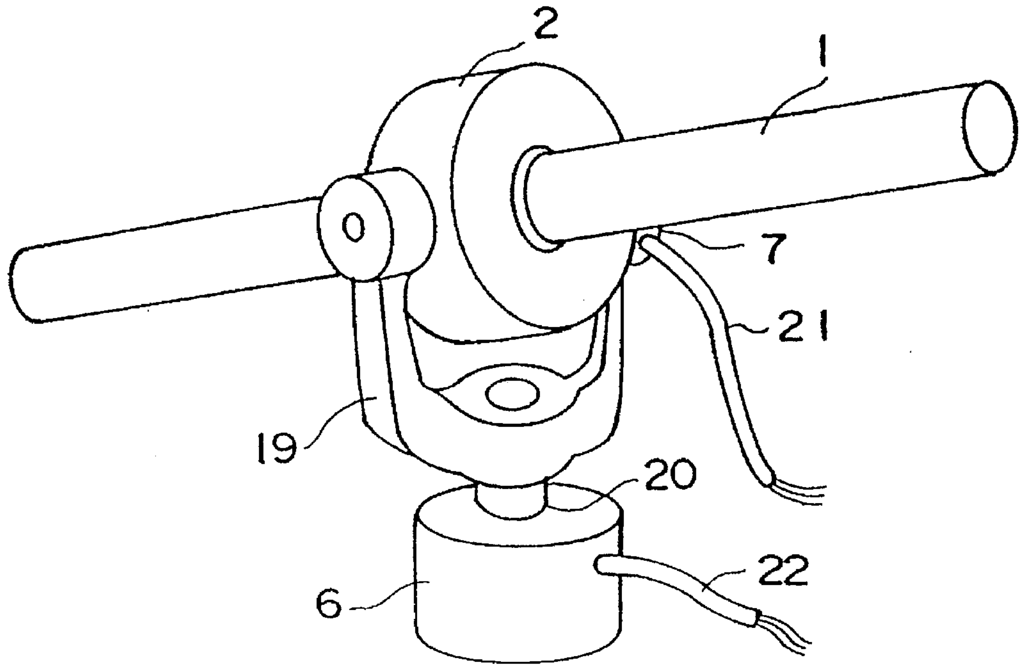

FIG. 9 is a perspective view showing still another embodiment of an input operation member according to the present invention. In this embodiment, an angle 2 sensor 7 is directly mounted on a support member 2 of an operation rod 1. The sensor 7 is supported by a support arm 19. The support arm 19 is fixed on a detection shaft of an angle 1 sensor 6. Other arrangements, operations, and effects of this embodiment are the same as those in the above embodiment.

Figure 10A:
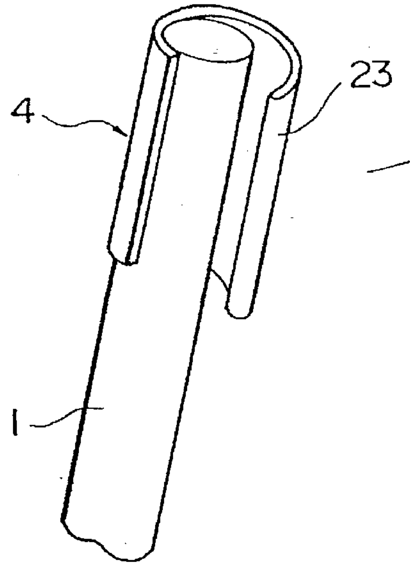
FIGS. 10(*a*) and 10(*b*) are explanatory views of a gripping portion of the operation rod.
Figure 10B:
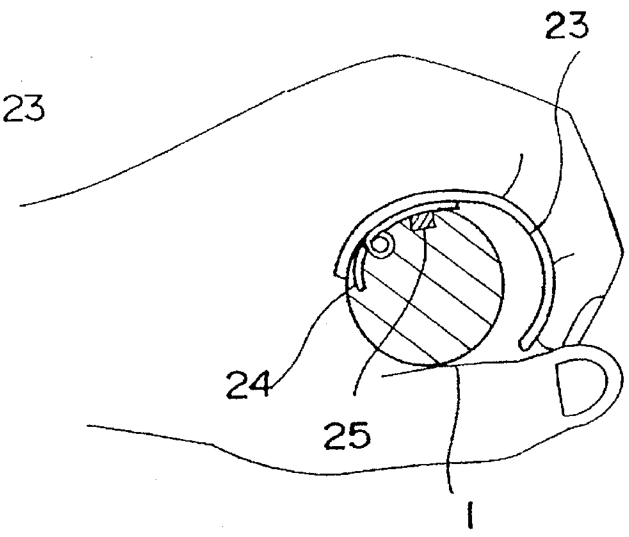

FIG. 10(*a*) and 10(*b*) show an arrangement of the gripping portion 4 as an operation grip of the input operation member according to the present invention.

A gripping segment 23 is fixed to the distal end portion of the operation rod 1, as shown in FIG. 10(*a*). When the gripping segment 23 approaches the outer peripheral surface of the operation rod 1 to some extent, it is biased by a spring 24 in a direction to be separated from the outer peripheral surface, as shown in FIG. 10(*b*). A pressure sensor 25 is arranged on the inner surface of the gripping segment 23. As shown in FIGS. 10(*a*) and 10(*b*), when the gripping portion 4 is gripped by a hand, the gripping segment 23 is deformed inwardly according to a gripping strength, and the pressure sensor 25 generates a detection output corresponding to the deformation amount. Thus, the gripping strength of the operation rod 1 can be detected.

Figure 11:
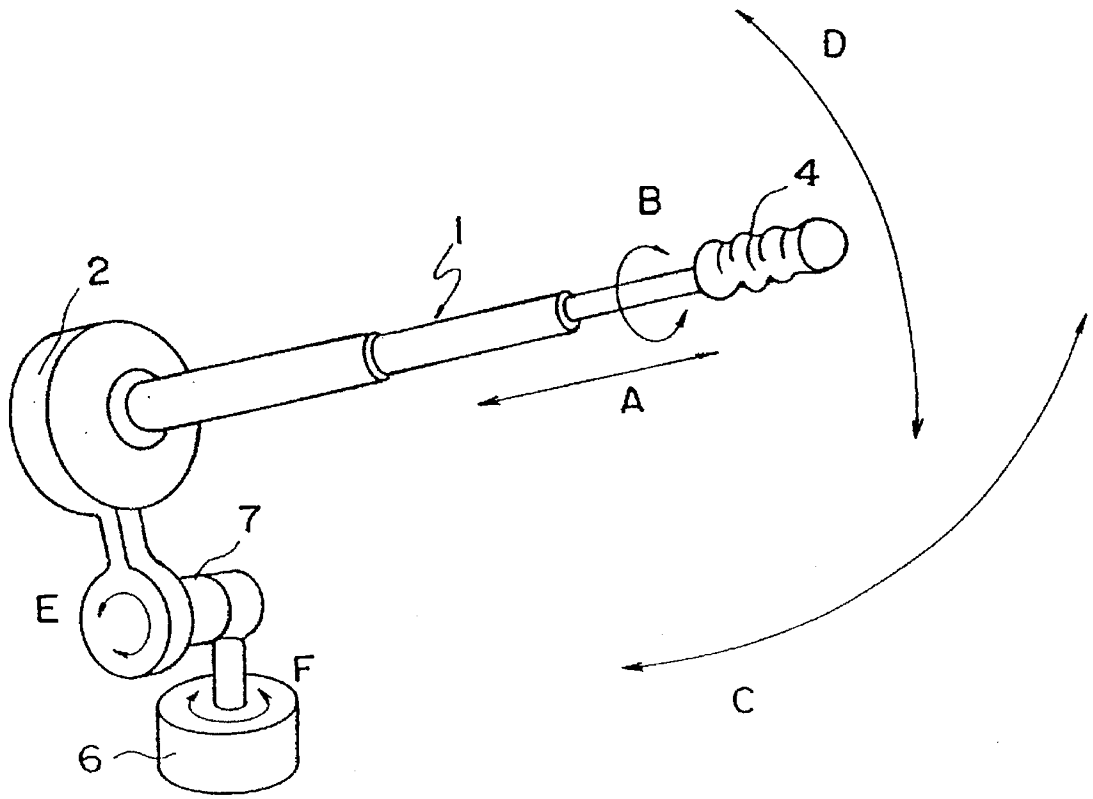
FIG. 11 is a perspective view showing another embodiment of an input operation member.

FIG. 11 is a perspective view showing still another embodiment of the input operation member according to the present invention.

In this embodiment, an operation rod 1 has a bellow type or telescopic type extendible structure, and its base portion is mounted on a support member 2 without extending through the support member 2. The support member 2 is mounted on an angle 2 detector 7. The angle 2 detector 7 is fixed to an angle 1 detector 6. The support member 2 is rotatable about the horizontal axis, as indicated by an arrow E, with respect to the angle 2 detector 7, and is rotatable about the vertical axis, as indicated by an arrow F, with respect to the angle 1 detector 6. In this structure, a gripping portion 4 at the distal end of the operation rod 1 is reciprocally movable along the longitudinal axis of the operation rod 1 with respect to the support member 2, as indicated by an arrow A. When extendible pipes of the operation rod 1 are coupled through splines or keys and key grooves to be non-rotatable, the gripping portion 4 is rotatable about the support member 2, as indicated by an arrow B, and the rotation of the gripping portion 4 can be detected by the above-mentioned rotation detection means arranged in the support member 2. The operation rod 1 is swingably rotatable in the azimuth direction in the horizontal plane (arrow C) and in the elevation angle direction in the vertical plane (arrow D) as in the above embodiment.

In the gripping portion 4 of the operation rod 1 of this embodiment, a pressure sensor (not shown) for detecting a gripping pressure is arranged like in the above embodiment.

An extending/contracting amount of the operation rod 1 of this embodiment can be detected by detecting resistances of contact portions of the extendible pipes over the total length of the operation rod. Thus, a change in resistance can be detected according to the extending/contracting amount.

In this embodiment, a mechanism for detecting the gripping pressure of the operation rod 1 is employed as described above (FIGS. 10(*a*) and 10(*b*)). According to the present invention, a detection means for detecting a pressing force for pressing the support member of the operation rod in a direction perpendicular to the apparatus installation surface may be arranged in place of such a gripping pressure detection means or in addition to it.

Figure 12:
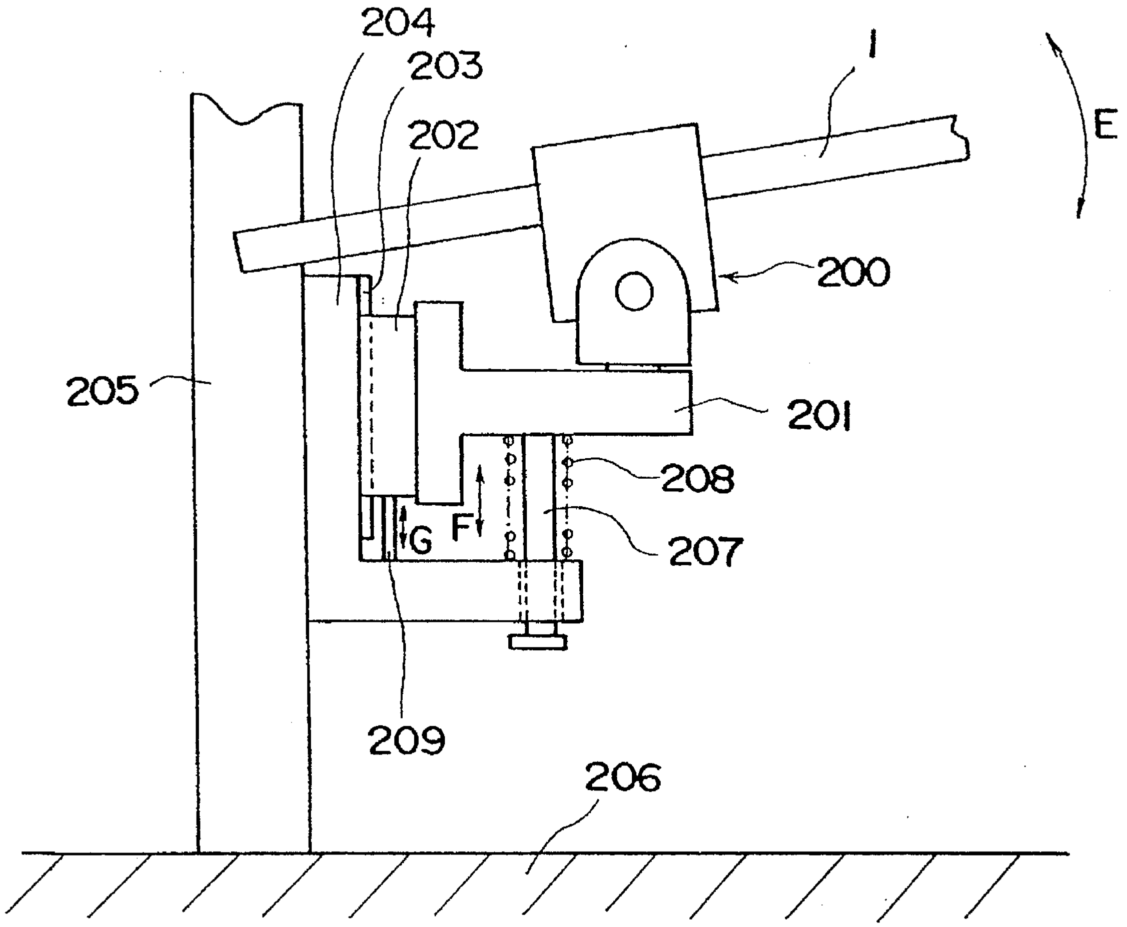
FIG. 12 is a view showing a structure of a pressing force detection means of the operation rod.

FIG. 12 shows an arrangement of the vertical pressing force detection means.

The operation rod 1 is mounted on a rotatable support member 200. The support member 200 is arranged on a support base 201. The support base 201 is fixed on a pressure detector 202. The pressure detector 202 is vertically slidable along a guide rail 203 together with the support base 201, i.e., in a direction perpendicular to an installation surface 206. The guide rail 203 is mounted on a base 204 fixed to a stationary column 205. The pressure detector 202 comprises a variable resistance type volume detector for detecting a vertical linear change as a change in resistance. A shaft 209 is vertically slid relative to the pressure detector 202 while its lower end is brought into contact with the base 204, thereby changing an internal resistance. The support base 201 comprises a guide rod 207 and a coil spring 208 arranged around the guide rod 207. The coil spring 208 is used to recover the support base 201 at a lower position toward an original position.

In the pressure detection means with the above arrangement, when the operation rod 1 is rotated in the vertical direction, as indicated by an arrow E, the support member 200 is vertically moved together with the support base 201, as indicated by an arrow F. More specifically, the pressure detector 202 is vertically moved along the guide rail 203, and hence, the shaft 209 is vertically moved relative to the pressure detector 202, as indicated by an arrow G, thus changing the internal resistance. Since the vertical moving amount corresponds to the pressing force of the operation rod 1, a change in resistance can be detected to detect the vertical pressing force of the operation rod.

The mounting position of a resistance detector, the arrangement and coupling position of the shaft 209 for changing a resistance, and the like may be appropriately modified. The vertical movement detection means is not limited to a resistance changing means, and may comprise a magnetic or capacitive change detection means, an optical means, or other position change detection means.

An electronic musical instrument when the input operation member with the arrangement of each of the above embodiments is used as an input apparatus to an electronic tone generation sound source together with a keyboard will be described below.

Figure 13:
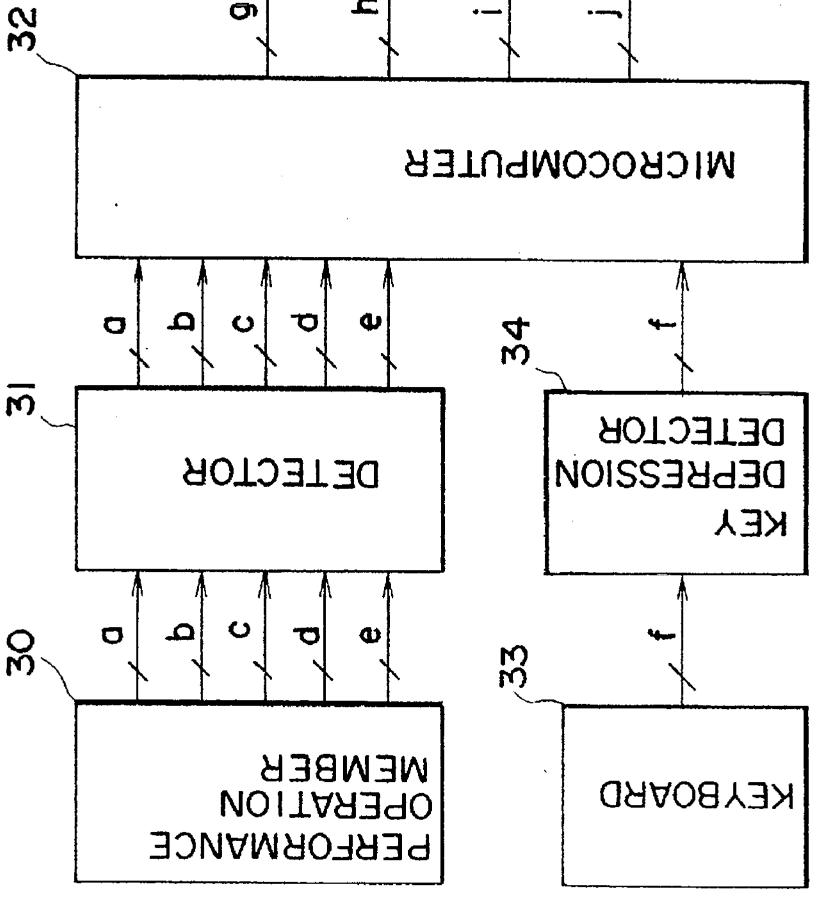
FIG. 13 is a block diagram showing an electronic musical instrument using the input operation member according to the present invention.

FIG. 13 is a block diagram showing the overall arrangement of the electronic musical instrument. A performance operation member 30 comprising the above-mentioned input operation member is connected to a microcomputer (CPU) 32 via a detector 31. A keyboard 33 is also connected to the CPU 32 through a key depression detector 34. The output terminal of the CPU 32 is connected to a sound source 35. The sound source 35 is connected to a sound system 36 comprising a loudspeaker.

Performance functions, e.g., rotation, reciprocal movement, and the like of the performance operation member 30 are detected by the corresponding detectors (represented by the detector 31 in FIG. 13 as a whole). Signal lines a, b, c, d, and e shown in FIG. 13 respectively indicate detection signals of the reciprocal movement amount, the angle 1, the angle 2, the gripping pressure (or pressing force in the vertical direction), and the rotational amount about an axis of the operation rod. The detection signals are input to the CPU 32. A detection signal of a key depressed on the keyboard 38 is input to the CPU 32 through the key depression detector 34. A signal line f indicates a detection signal of a key code of the depressed key. In this embodiment, key-ON detection is processed in a software manner on the basis of a key code input, as will be described later, and is not used as an input signal.

The CPU 32 performs predetermined arithmetic operation on the basis of the detection signals to calculate a bow velocity signal g, a bow pressure signal h, a delay signal i, and other parameters j, e.g., a decay coefficient corresponding to a bow of a bowed instrument, and inputs the calculated parameters to the sound source 35. An electronic tone is synthesized in the sound source 35 on the basis of the parameters controlled upon operation of the performance operation member, and the synthesized tone is output from the sound system 36 as a performance tone of a bowed instrument such as a violin.

The relationship between the detection signals of the performance operation member and the control input parameters of the sound source will be described in more detail below.

Figure 14:
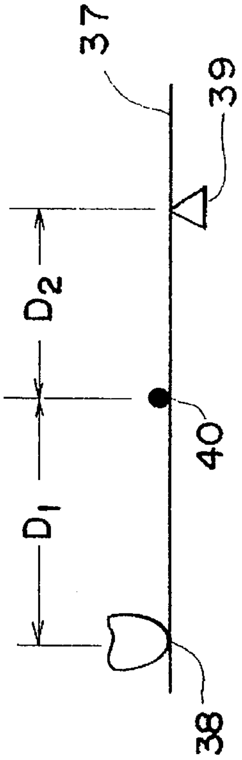
FIG. 14 is an explanatory view showing the positional relationship between a string and a bow.

FIG. 14 shows a model of a string and a bow. Reference numeral 37 denotes a string; 38, a finger (or its position); 39, a bridge; and 40, a bow (or its position). If a distance between the finger 38 and the bow 40 is represented by D1 and a distance between the bridge 39 and the bow 40 is represented by D2, D1+D2 is determined by a key code. D1 and D2 correspond to delay times of a musical tone synthesis/delay circuit (to be described later), which correspond to resonance frequencies of strings on two sides of the bow 40. The position of the bow 40 corresponds to the rotational amount of the operation rod, thereby determining a ratio D1:D2.

Figure 15:
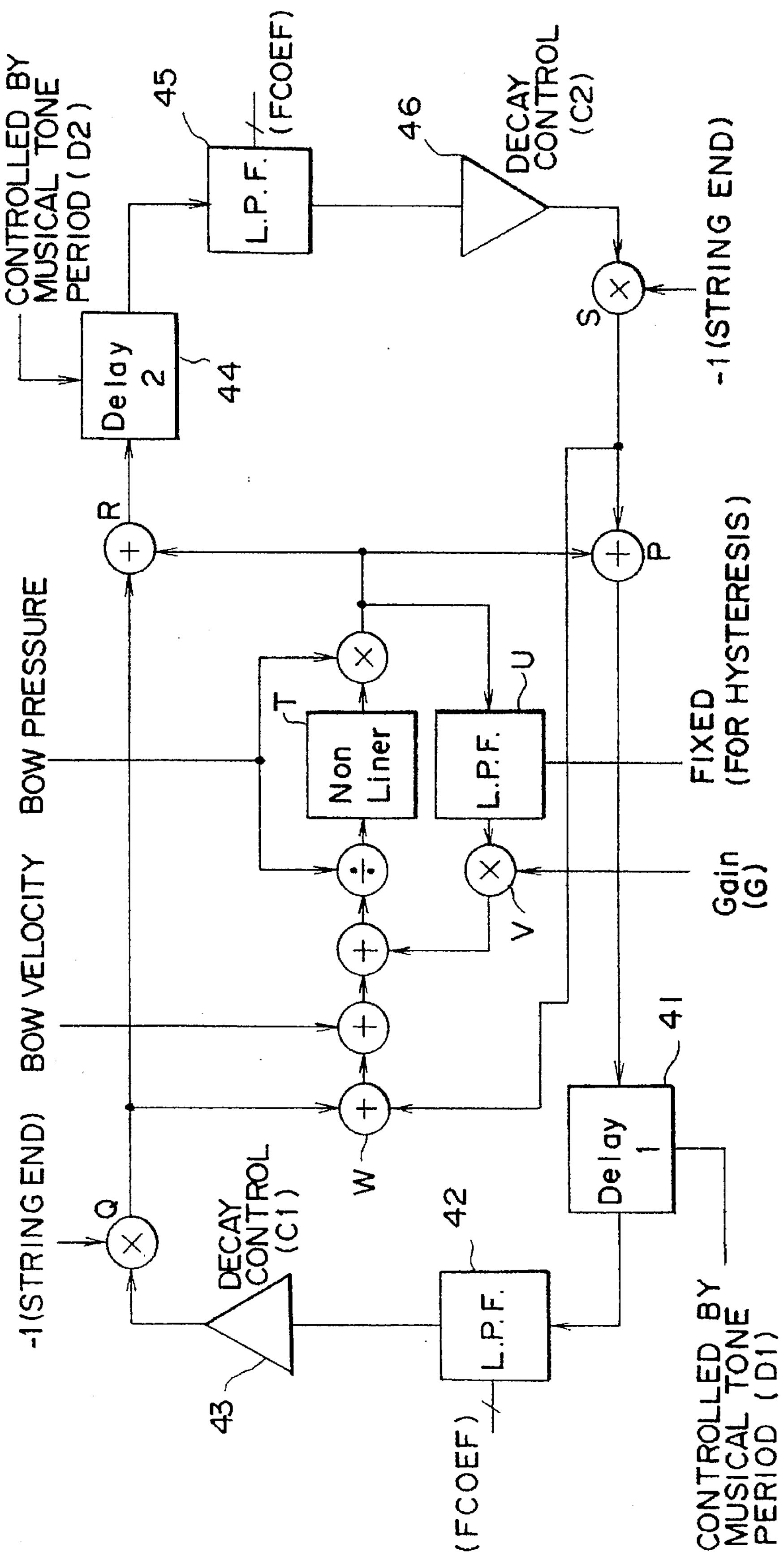
FIG. 15 is a circuit diagram showing a sound source.

FIG. 15 shows a circuit of a physical sound source for synthesizing an electronic tone corresponding to the model of the string and the bow. Reference symbols P and R denote adders corresponding to a bowed point (the bow 40 in FIG. 14). Reference symbols Q and S denote multipliers corresponding to string ends (positions of the finger 38 and the bridge 39 in FIG. 14) at two sides of the bowed point. A closed loop constituted by the adder P, a delay circuit 41, a low-pass filter (LPF) 42, an attenuator 43, and the multiplier Q corresponds to a string portion on one side of the bowed point, and a delay time of the closed loop corresponds to the resonance frequency of the string. Similarly, a closed loop constituted by the adder R, a delay circuit 44, an LPF 45, an attenuator 48, and the multiplier S corresponds to a string portion on the other side of the bowed point.

Reference symbol T denotes a nonlinear function generator. The nonlinear function generator receives a signal as a sum of a signal obtained by synthesizing outputs from the two closed loops on the two sides of the bowed point by an adder W, a signal corresponding to a bow velocity, a signal from a fixed hysteresis LPF U, and a gain G input to a multiplier V. Hysteresis control of the nonlinear function generator T is performed by a signal corresponding to a bow pressure.

In the sound source circuit with the above arrangement, a bow velocity signal is obtained by arithmetic processing of a position detection signal of the operation rod of the performance operation member, and a bow pressure signal is obtained based on a detection signal of a gripping pressure of the operation rod or a detection signal of a pressing force of the support member. Delay times of the delay circuits 41 and 44 correspond to a bow position (i.e., D1 and D2 (FIG. 14)). The bow position can be obtained based on a detection signal of the rotational amount of the operation rod. Cutoff frequencies as parameters of the LPFs 42 and 45 define a tone color of a musical tone, and are obtained based on a detection signal of the angle 2 of the operation rod. A decay speed can be obtained based on a detection signal of the angle 1 of the operation rod.

As described above, when the detection signals of the operation rod of the performance operation member are input to the respective circuits of the sound source as parameters, an electronic tone according to a bowed state of the bowed instrument can be generated.

Figure 16:
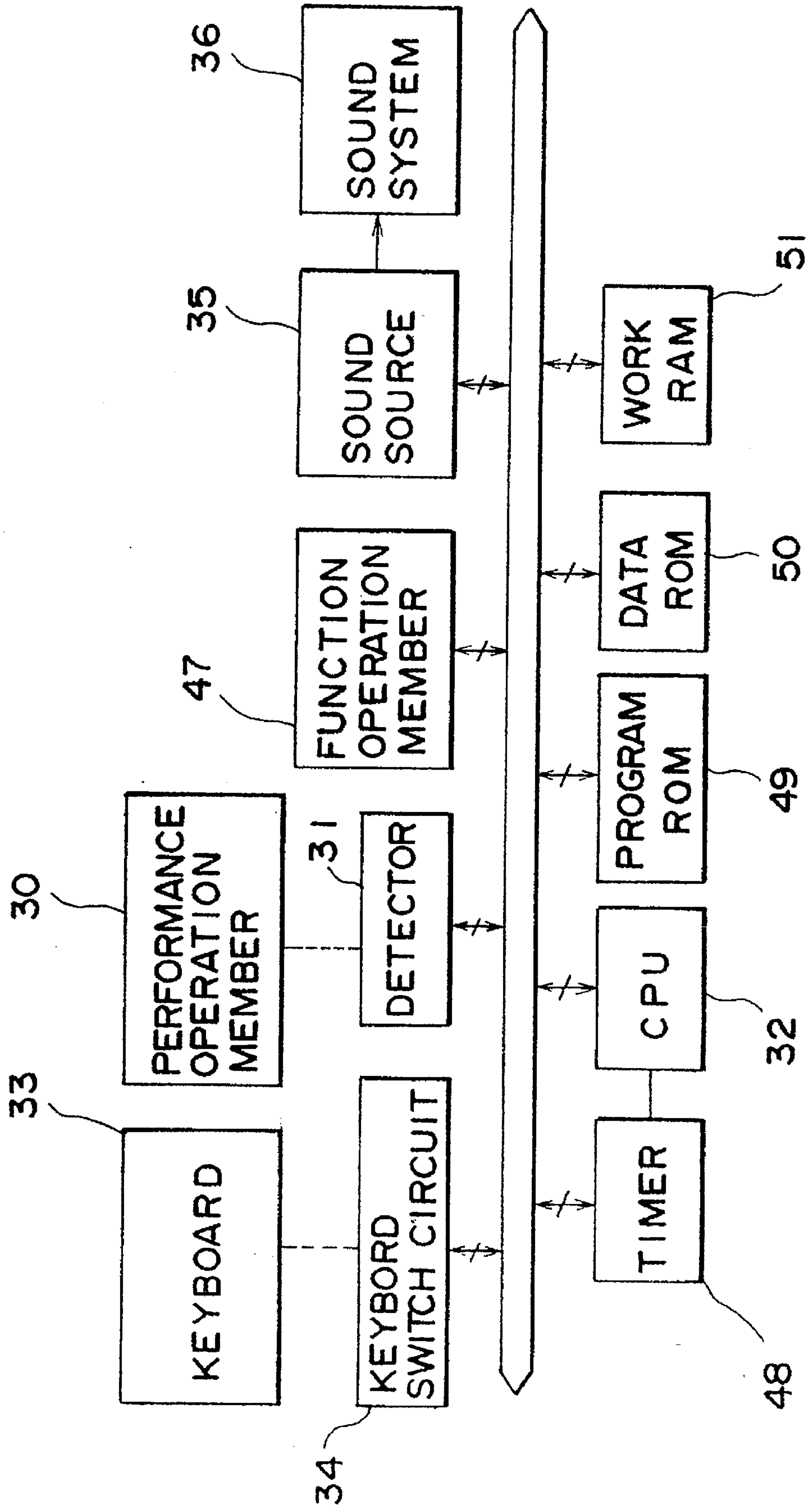
FIG. 16 is a block diagram of a musical tone control mechanism according to the present invention.

FIG. 16 is a block diagram of a control mechanism of the electronic musical instrument according to the present invention. As described above, signals from the performance operation member 30 and the keyboard 33 are input from a bus line to the CPU 32 via the detector 31 and the key depression detector (or keyboard switch circuit) 34. The CPU 32 reads out necessary data from a program ROM 49 for storing routine programs, a data ROM 50 for storing data necessary for arithmetic processing, and a work RAM 51 for storing intermediate calculation results in the arithmetic processing, and calculates the musical tone control parameters, as described above. A function operation member 47 is normally used to select a tone color, vibrato, and the like, or to switch various modes. In this embodiment, the operation member 47 is used to switch detection modes of bow position detection and bow velocity detection, and the like. A timer 48 calls an interrupt routine for a fixed cycle of about several ms in the main routine executed by the CPU 32.

Figure 17:
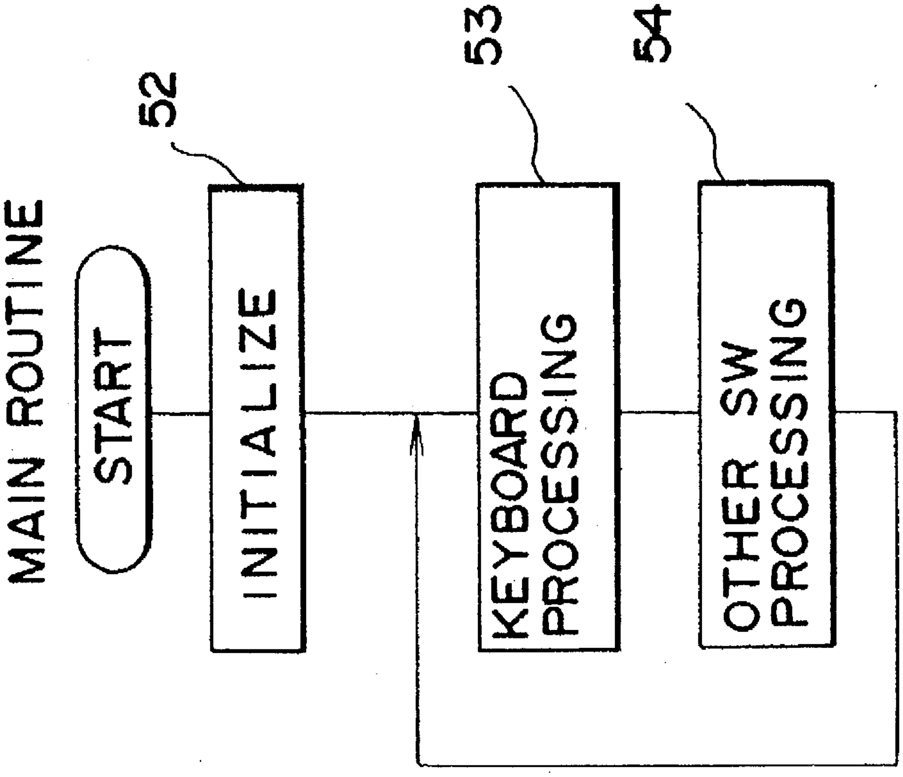
FIG. 17 is a flow chart of a main routine.

FIG. 17 shows the basic main routine. In step 52, initialization is performed. Key-ON switch processing of the keyboard (step 53) and other switch processing (step 54) are repeated. The interrupt routine (to be described later) is executed for a predetermined cycle by the timer 48 (FIG. 16) in the main routine, thus calculating the above-mentioned control input parameters.

Figure 18:
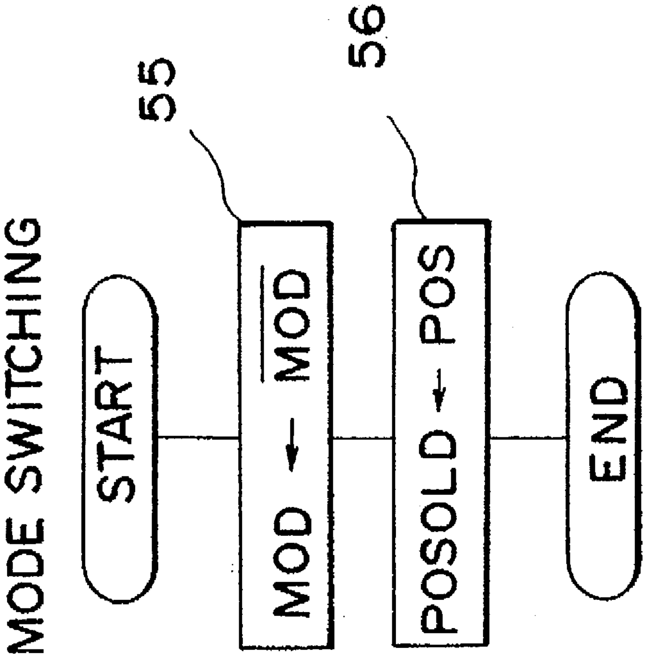
FIG. 18 is a flow chart of a mode switching routine.

FIG. 18 shows a mode switching routine. In step 55, a mode such as a detection mode is switched. In step 56, detection results and the like are stored in registers for the next detection/arithmetic processing. Reference symbol MOD denote an operation mode register. In this register, "0" represents a mode for converting a reciprocation velocity of the operation rod into a bow velocity, and "1" represents a mode for converting the position of the operation rod into a bow velocity. Reference symbol POS denotes a register for storing position data of the operation rod; and POSOLD, a register for storing position data of the operation rod in an immediately preceding detection operation.

Figures 19, 20:
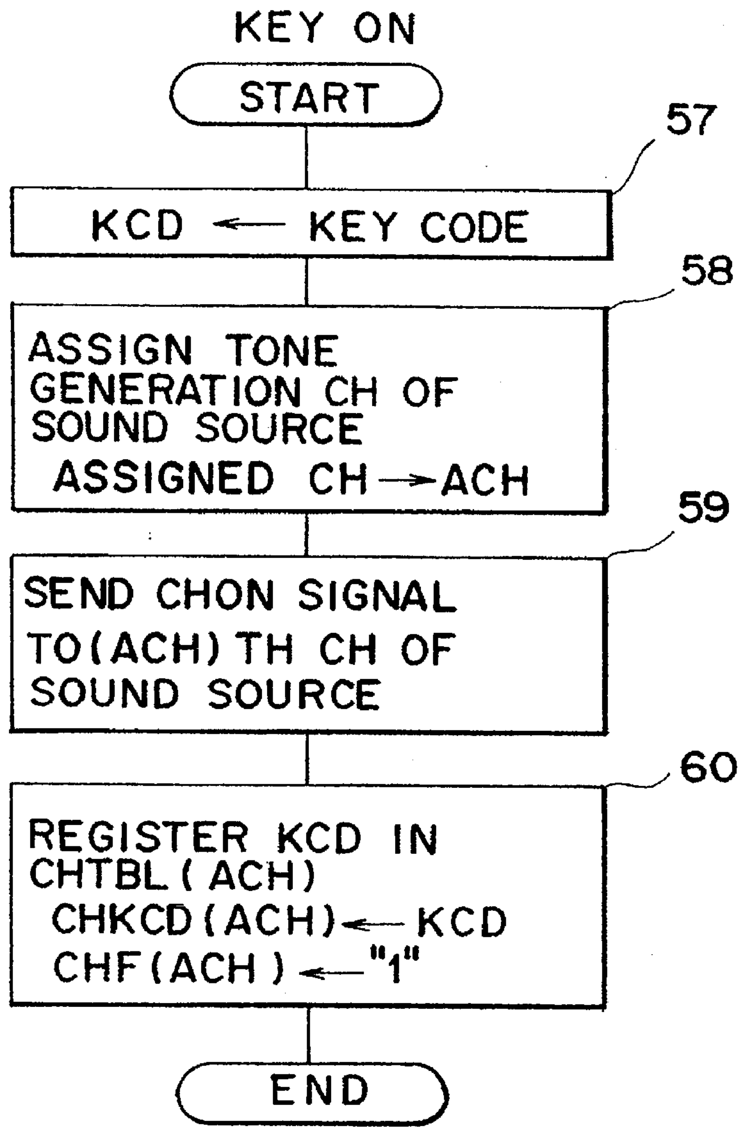
FIG. 19 is a flow chart of a key-ON routine.
FIG. 20 is an explanatory view of a channel table.

FIG. 19 shows a key-ON routine. A key code of an ON key is stored in a key code register (KCD) (step 57). A tone generation channel of the sound source is then assigned. The assigned channel is stored in an assign channel register (ACH) (step 58). A channel-ON (CHON) signal is set to the assigned channel of the sound source (step 59). The key code is then registered in the assigned channel (ACH) of a channel table shown in FIG. 20 (step 60). In this case, a signal "1" is input to a flag of the channel where the key code is registered.

Figure 21:
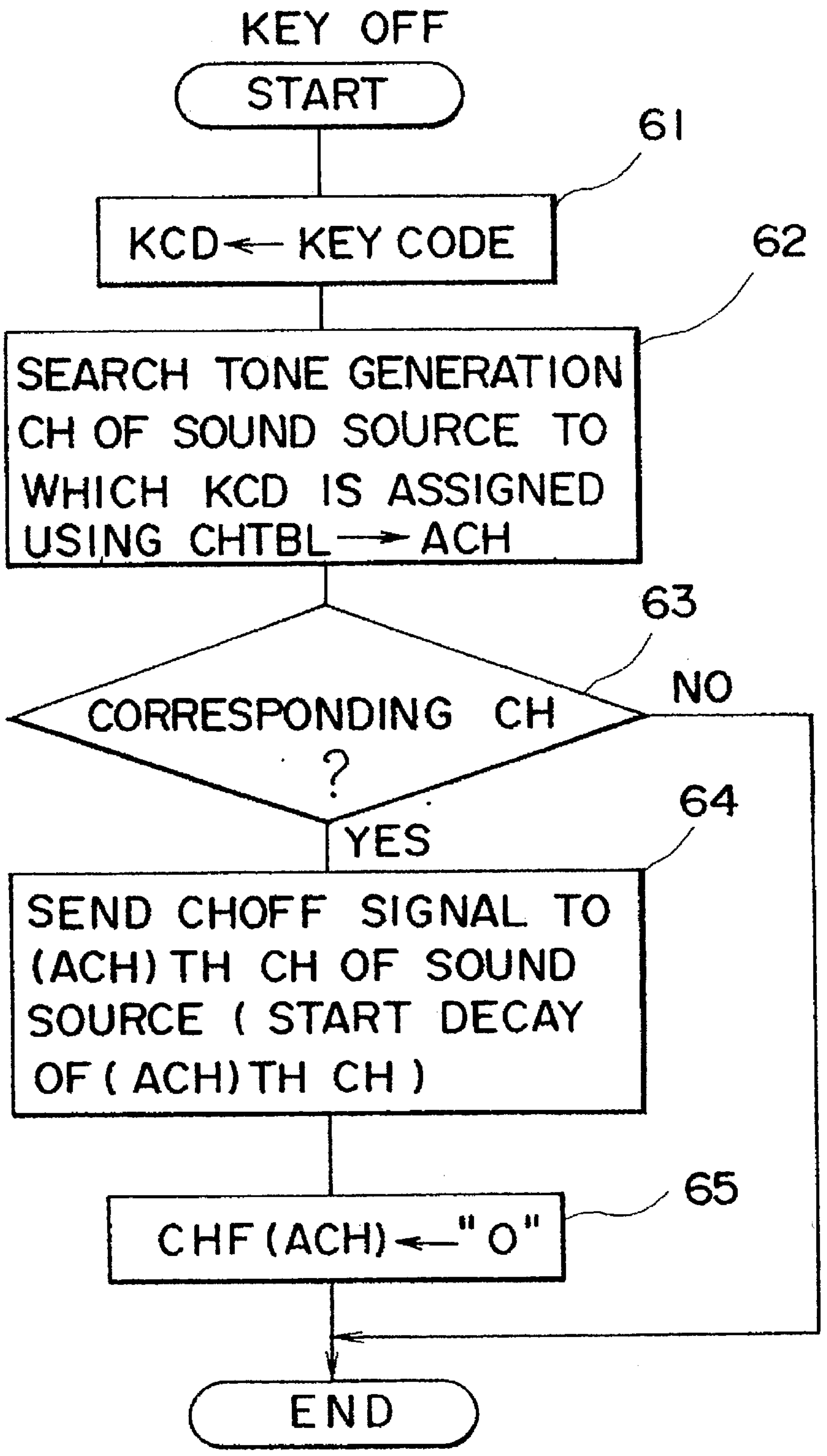
FIG. 21 is a flow chart of a key-OFF routine.

FIG. 21 shows a key-OFF routine. A key code of an OFF key is stored in the KDC (step 61). A tone generation channel of the sound source to which the stored key code is assigned is searched using the channel table (step 62). It is checked in step 63 if such a channel is detected. If NO in step 63, the routine is ended; otherwise, a channel-OFF signal is sent to the detected tone generation channel of the sound source to cut a tone of this channel (step 64). At this time, a decay operation of the cut tone is started. A signal "0" is input to the channel flag of the channel table corresponding to the OFF channel (step 65).

Figure 22:
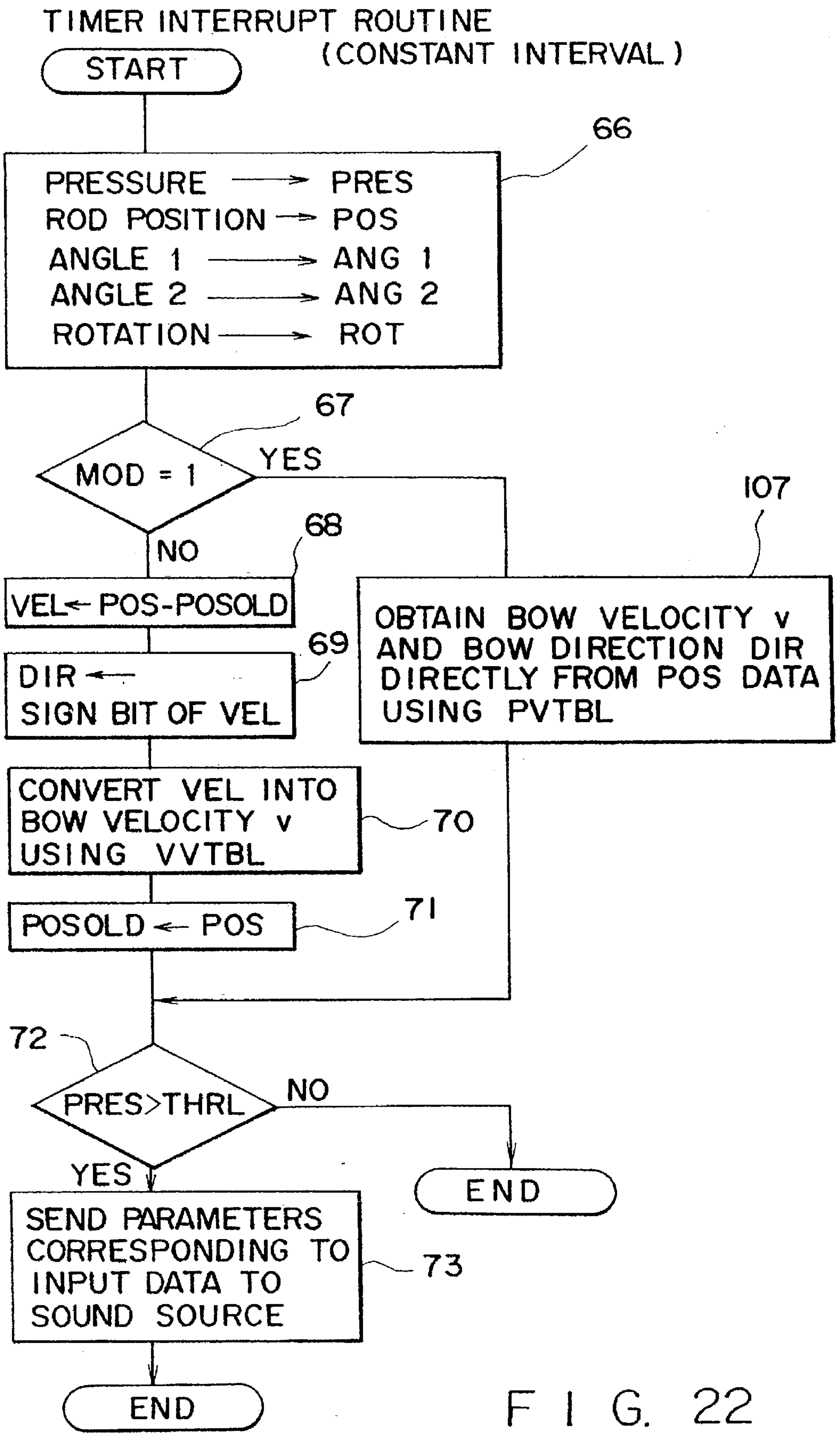
FIG. 22 is a flow chart of an interrupt routine.

FIG. 22 shows the interrupt routine which interrupts the main routine at predetermined time intervals based on the fixed clock. The detection values of the performance operation member, i.e., the gripping pressure of the operation rod or the pressing force of the support member, the position, the angle 1, the angle 2, and the rotational amounts are stored in corresponding registers PRESS, POS, ANG1, ANG2, and ROT (step 66). It is then checked in step 67 if the MOD register is "1". If YES in step 67, a bow velocity and its direction (DIR) are directly obtained from the position data of the operation rod which is input to the register POS using a table (PVTBL) which is formed and stored in advance (step 107). If NO in step 67, the flow advances to step 68, a velocity VEL of the rod is obtained based on a difference (POS–POSOLD) between the present and previous position data. In this case, since an interval between the two detection timings is constant, the difference between the positions directly corresponds to the velocity. The direction (DIR) of the bow is obtained based on a code bit of the velocity VEL of the rod (step 69). A bow velocity v of the bow is obtained based on the velocity VEL of the rod using a conversion table (VVTBL) (step 70). The detection data is stored in the POSOLD (step 71). It is then checked in STEP 72 if the pressure data PRES is larger than a predetermined threshold value (THRL). If NO in step 72, the data is ignored as noise. However, if YES in step 72, parameters corresponding to the input data are input to the sound source.

Figure 23:
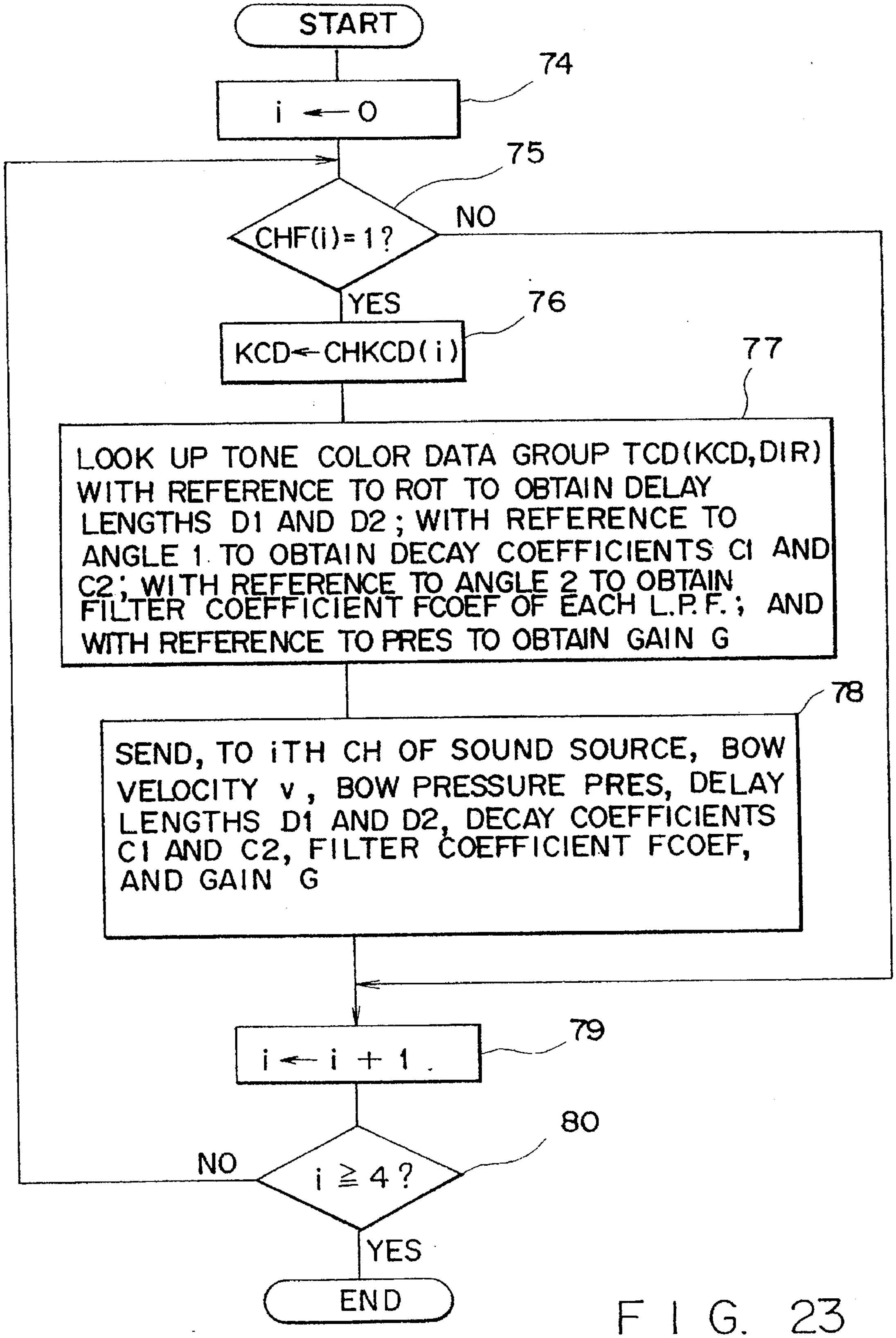
FIG. 23 is a flow chart of an input parameter generation/output routine.

FIG. 23 shows an input routine to the sound source in step 73 in the interrupt routine (FIG. 22). In this embodiment, the number of channels of the sound source is four in correspondence with the number of strings of a violin. Since a plurality of sound sources are arranged in this manner, when a key-ON signal transits from a certain channel to another channel, a reverberation effect of an original channel can be obtained. In step 74, a number i is set to check channels one by one. In step 75, it is checked if the channel flag is "1", i.e., the tone generation channel receives a key code (key-ON). If NO in step 75, the channel number is incremented by one, and the checking operation is repeated (step 79). If YES in step 75, a key code (CHKCD) of the corresponding channel is input to the key code register (KCD) (step 76). In step 77, musical tone parameters are obtained on the basis of the key code (KCD) data and the bow direction (DIE) data from a tone color data group TCD. In this case, since the parameters are changed depending on DIR, a tone color is changed depending on the bow direction. Delay lengths D1 and D2 are obtained based on the rotational amount. In this case, since the key code (corresponding to D1+D2) is given, D1 and D2 can be easily obtained. Delay coefficients C1 and C2 are obtained based on data of the angle 1. The coefficients C1 and C2 are used to attenuation control of the attenuators 43 and 46 in the sound source circuit shown in FIG. 15. Filter coefficients of the LPFs 42 and 45 (FIG. 15) are obtained based on data of the angle 2. The gain G is obtained based on pressure data. The bow velocity v, the bow pressure PRES, the delay lengths D1 and D2, the decay coefficients C1 and C2, the filter coefficients FCOEF, and the gain G are sent to the key-ON ith channel (step 78). The number i is incremented by one (step 79), and all the four channels are checked (step 80). In step 77, a plurality of tone color groups may be prepared, and may be switched based on a selected tone color. In this case, conversion tables (VVTBL, PVTBL) are preferably prepared in units of tone colors.

Figure 24:
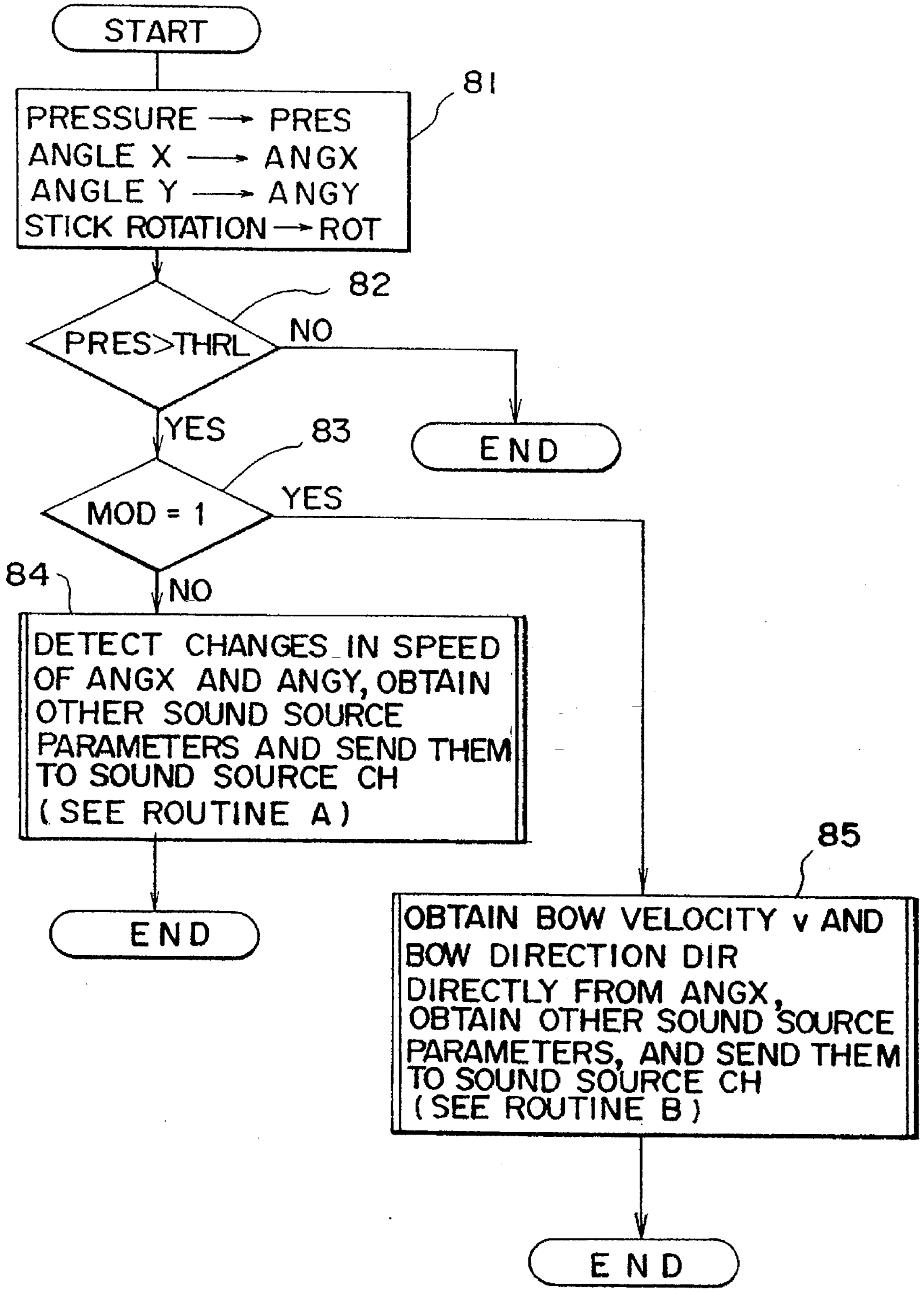
FIG. 24 is a flow chart of another interrupt routine.
Figure 25:
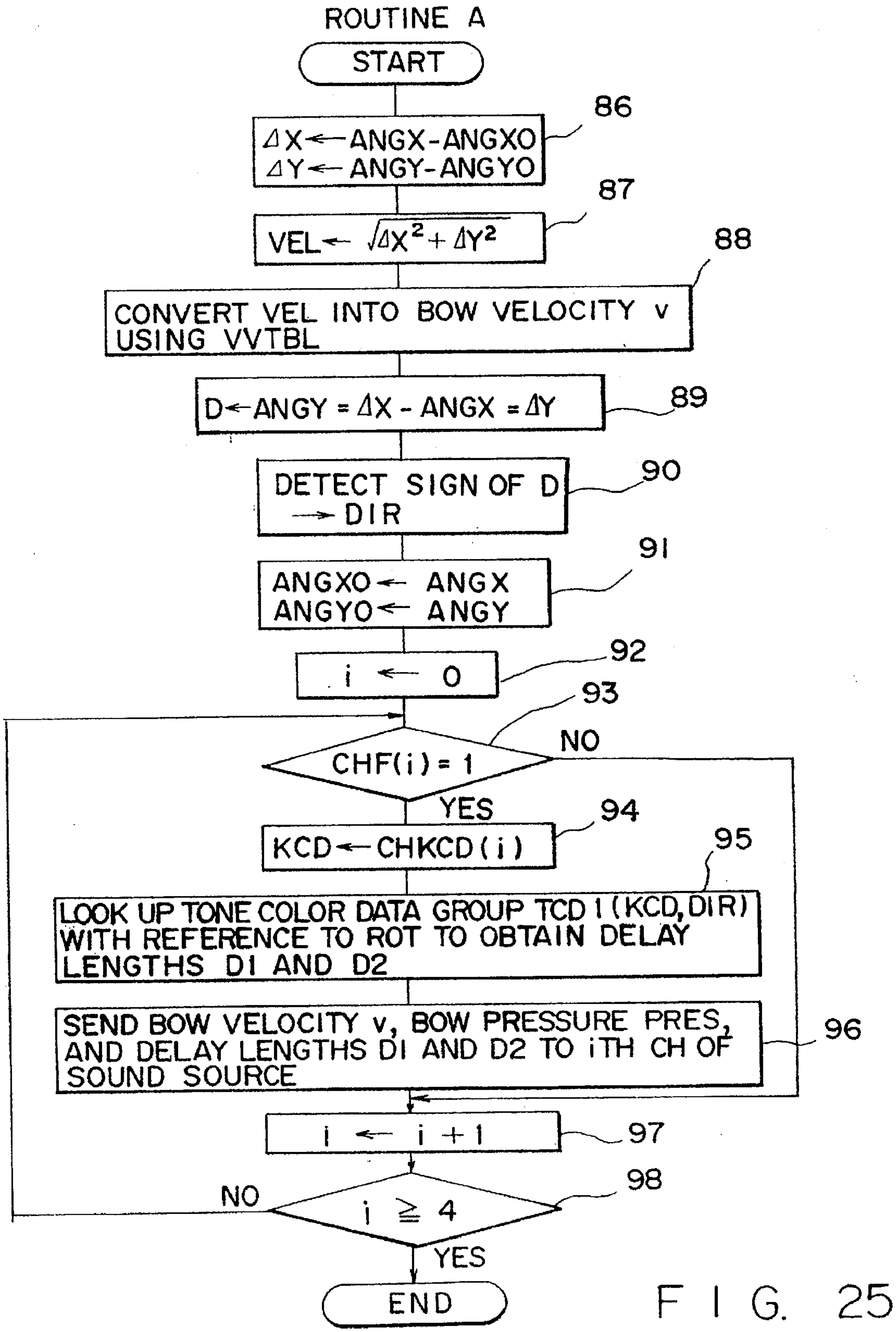
FIGS. 25 and 26 are flow charts showing other steps of the input parameter generation/output routine in the interrupt routine shown in FIG. 24.

FIG. 24 shows another interrupt routine. In step 81, data of a pressure, an angle X (corresponding to the angle 1), an angle Y (corresponding to the angle 2), and a rotational amount are stored in corresponding registers. If the pressure exceeds a predetermined threshold value (step 82), it is checked whether the MOD is "1" or "0" (step 83). If MOD="0", change rates of the angles X and Y are detected, and other sound source parameters are obtained. The obtained parameters are sent to a tone generation channel (step 84). Step 84 is shown in a routine A (FIG. 25). On the other hand, if MOD="1", the bow velocity v and the bow direction are directly detected based on the angle X, and other sound source parameters are obtained. The obtained parameters are then sent to a tone generation channel (step 85). Step 85 is shown in routine B (FIG. 26).

In the routine A shown in FIG. 25, changes in angles X and Y are stored in registers ΔX and ΔY (step 86). In step 87, the velocity VEL of the rod is calculated based on data in the registers ΔX and ΔY. In step 88, the velocity VEL of the rod is converted into the velocity v of the bow with reference to the table VVTBL. Then, a rotational result is calculated (step 89), and its direction is detected to obtain the bow direction DIR (step 90). The data of the angles X and Y are stored in the registers (step 91). The bow velocity v, the bow pressure PRES, and the delay lengths D1 and D2 are sent to a key-ON channel in the same routine (steps 92 to 98) as the input parameter output routine to the sound source shown in FIG. 23. In step 95, only the delay lengths D1 and D2 are obtained based on the rotational amount unlike in step 77 in FIG. 23.

Figure 26:
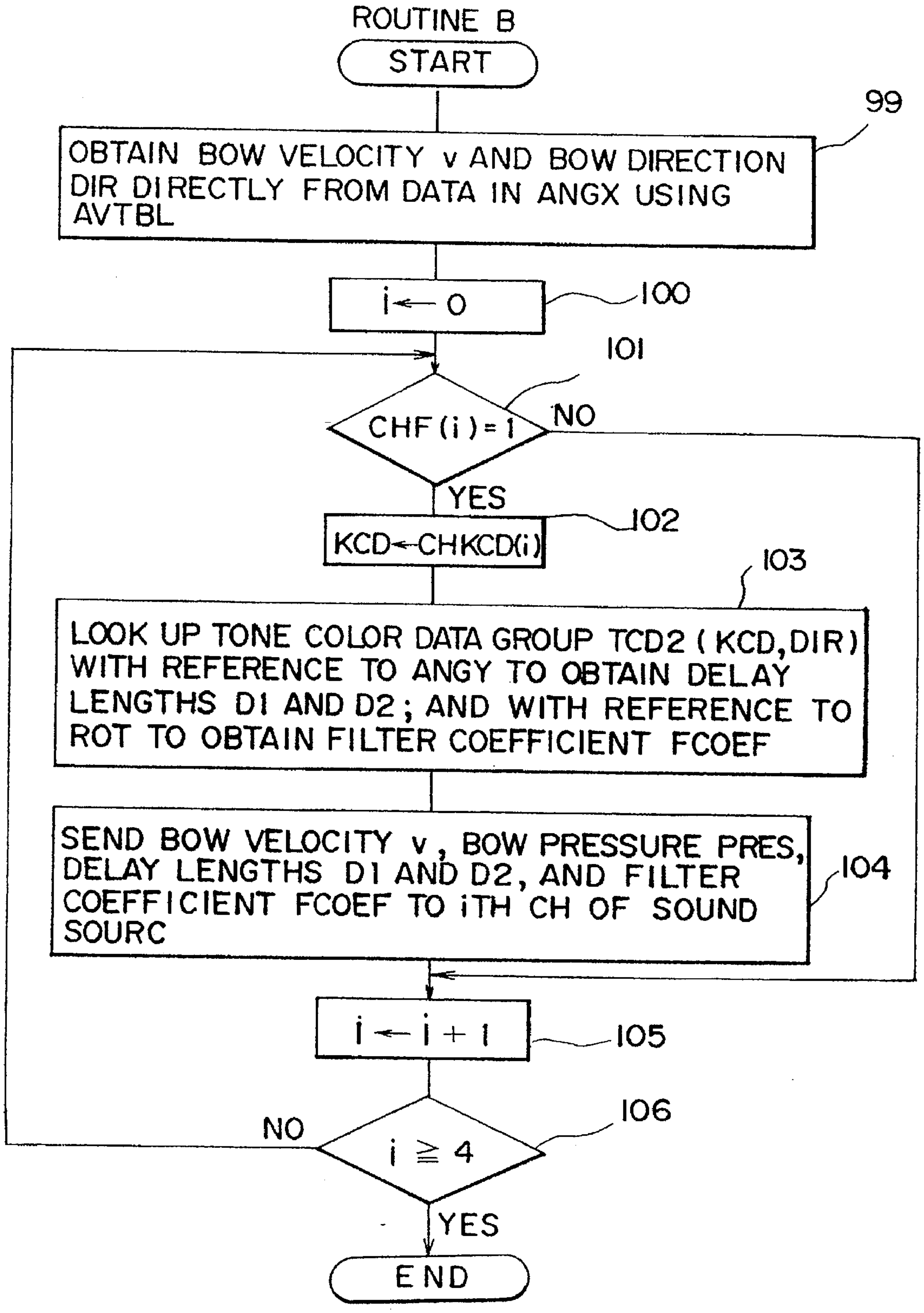

In the routine B shown in FIG. 26, the bow velocity v and its direction DIR are directly obtained based on the angle X with reference to the conversion table (step 99). The bow velocity v, the bow pressure PRES, the delay lengths D1 and D2, and the filter coefficients FCOEF are sent to a key-ON channel in the same routine (steps 100 to 106) as the input parameter output routine to the sound source shown in FIG. 23. In step 103, only the delay lengths D1 and D2 and the filter coefficients FCOEF are obtained based on the angle Y and the rotational amount unlike in step 77 in FIG. 23.

Modification of Embodiments

In the above embodiments, a signal for controlling a bow pressure employs one of a gripping pressure and a pressing force, but may employ both. The sound source is not limited to the circuit shown in FIG. 15, and may comprise an arithmetic type (FM sound source, high-frequency synthesis sound source) sound source or a waveform memory type sound source, or a composite type sound source of the above-mentioned sound sources.

The input operation member of the present invention may be applied to input apparatuses of various other electronic apparatuses, e.g., a reverberation apparatus, an effecter apparatus, a filter circuit, a game machine in addition to the electronic musical instrument.

Effect of the Invention

As described above, according to the present invention, one operation member is axially moved to obtain a control signal, and a large number of control parameters can be simultaneously input, thus improving operability and a use feeling of an input operation.

When the input apparatus of the present invention is used as that for controlling musical tone parameters of an electronic musical instrument, it can be used as a performance operation member which can be operated like a bow of a bowed instrument in addition to a keyboard. Therefore, a performance feeling near an acoustic bowed instrument can be obtained. In addition, performance functions (operations) of the performance detection member can be detected to generate parameters corresponding to string rubbing operations between strings and a bow of the bowed instrument, and can be input to a sound source. As a result, a synthesized tone approximate to a performance tone of an acoustic bowed instrument can be generated.

What is claimed is:

1. An electronic musical instrument comprising:

a performance operation member for controlling musical tone generation parameters in correspondence with performance functions, said performance operation member comprising a rod-like member having a gripping portion at a distal end thereof, and said rod-like member being movable along an axial direction thereof;

gripping pressure detection means for detecting the amount of a gripping pressure exerted on the gripping portion by a player;

a support member supporting said rod-like member so that said rod-like member is capable of sliding along the axial direction with respect to said support member; and moving amount detection means for detecting a sliding amount of said rod-like member; and a sound source means for generating an electronic tone on the basis of the detected gripping pressure amount and the detected sliding amount.

2. An instrument according to claim 1, wherein said performance operation member generates at least one of control signals corresponding to a bow position, a bow velocity, and a bow pressure of a bowed instrument.

3. An instrument according to claim 1, wherein said support member rotatably supports said rod-like member about an axis thereof, and swingably and rotatably supports said rod-like member with respect to an instrument main body.

4. An instrument according to claim 3, wherein said performance operation member comprises detection means for respectively detecting a rotational amount about the axis, an axial moving amount of said rod-like member, and a gripping force of said gripping portion, or a vertical pressing force of said support member, detection values corresponding to a bow position, a bow velocity, and a bow pressure of a bowed instrument.

5. An electronic musical instrument comprising:

a performance operation member for controlling musical tone generation parameters in correspondence with performance functions, said performance operation member comprising a rod-like member having a gripping portion at a distal end thereof, and said rod-like member being movable along an axial direction thereof;

a support member, the rod-like member extending through the support member, said support member rotatably supporting said rod-like member about an axis thereof, and swingably and rotatably supporting said rod-like member with respect to an instrument main body; and a sound source for generating an electronic tone on the basis of inputs from said performance operation member;

said performance operation member further comprising detection means for respectively detecting a rotational amount about the axis, an axial moving amount of said rod-like member, and a gripping force of said gripping portion, or a vertical pressing force of said support member, detection values corresponding to a bow position, a bow velocity, and a bow pressure of a bowed instrument;

wherein said sound source comprises a delay circuit for determining a delay time corresponding to the bow position, a low-pass filter for determining a tone color, an attenuator for determining a decay speed of a tone, and a function generator for generating a nonlinear function of predetermined hysteresis characteristics according to the bow pressure and the bow velocity.

6. An instrument according to claim 5, wherein said sound source is arranged so that the delay time is controlled based on the detection value of the rotational amount about the axis of said rod-like member, said attenuator is controlled based on one of the detection values of angles in horizontal and vertical planes of said rod-like member, said low-pass filter is controlled based on the other detection value, and said function generator is controlled based on the detection values of the axial moving amount and the gripping pressure of said gripping portion of said rod-like member.

7. An electronic musical instrument comprising:

a) an operation member to be operated by a player;

b) detecting means for detecting a moving amount of the operation member operated by the player;

c) signal generating means for generating an input signal;

d) closed loop means, including delay means, for receiving said input signal and generating a musical tone signal by circulating said input signal in said closed loop means, the delay means delaying a signal inputted therein; and e) control means for controlling said delay means in said loop means in response to said moving amount detected by said detecting means in real time.

8. An electronic musical instrument according to claim 7, wherein said loop means simulates a string and a bow of a string instrument, and said moving amount represents a performance of the bow operated by the player on said string of said string instrument.

9. An electronic musical instrument comprising:

a) an operation member to be operated by a player;

b) detecting means for detecting a moving amount of the operation member operated by the player;

c) signal generation member for generating an input signal;

d) closed loop means, including delay means and filter means, for receiving said input signal and generating a musical tone signal by circulating said input signal in said closed loop means, the delay means delaying a signal inputted therein and the filter means filtering a signal passed therethrough; and e) control means for controlling a frequency characteristic of said filter means in said loop means according to said moving amount detected by said detecting means.

10. An electronic musical instrument according to claim 9, wherein said frequency characteristic of said filter means controlled is a cutoff frequency.

11. An electronic musical instrument comprising:

a) an operation member to be operated by a player;

b) detecting means for detecting a moving amount of the operation member operated by the player;

c) signal generation member for generating an input signal;

d) closed loop means, including delay means, for receiving said input signal and generating a musical tone signal therefrom by circulating said input signal in said closed loop means; and e) control means for controlling weakening of the musical tone signal as said input signal circulates in said loop means, and said weakening of the musical tone signal is controlled in response to said moving amount detected by said detecting means.

12. An electronic musical instrument comprising:

a) an operation member to be operated by a player;

b) detecting means for detecting a moving amount of the operation member operated by the player;

c) closed loop means, including delay means, for receiving an input signal and generating a musical tone signal by circulating said input signal in said closed loop means, the delay means delaying a signal inputted thereto; and d) signal generation member for receiving a signal corresponding to the detected moving amount and a signal extracted from said closed loop means and for generating the input signal in response to the received signals, wherein a non-linear characteristic between the received signal and the input signal is controlled in response to said moving amount detected by said detecting means in real time.

13. An electronic musical instrument for simulating a rubbed string instrument with a bow comprising:

a) an operation member to be operated by a player;

b) detecting means for detecting a musical performance operated by the player with the operation member and generating performance signals corresponding to a bow pressure, a bow speed and a bow direction of said string instrument to be simulated;

c) musical tone generating means for generating a musical tone signal in response to said performance signal; and d) control means for controlling said musical tone generating means to generate said musical tone signal based on a performance signal corresponding to said bow direction.

14. An electronic musical instrument according to claim 13, wherein said musical tone generating means has closed loop means and signal generation means, the closed loop means which includes delay means receives an input signal and generates a musical tone signal by circulating said input signal therein, and the signal generation means generates the input signal, the delay means delaying a signal inputted therein.

15. An electronic musical instrument comprising:

a) an operation member to be operated by a player;

b) detecting means for detecting a musical performance operated by the player with the operation member;

c) signal generating means for generating an input signal;

d) closed loop means, including delay means, for receiving said input signal and generating a musical tone signal by circulating said input signal in said closed loop means, the delay means delaying a signal inputted therein; and e) control means for controlling said delay means in said loop means in response to said musical performance detected by said detecting means in real time;

wherein said operation member includes a rod-like member to be operated by a player, and said detecting means detects a moving amount and a pressure amount exerted on the rod-like member by the player as the musical performance.

16. An electronic musical instrument comprising:

a) an operation member to be operated by a player;

b) detecting means for detecting a musical performance operated by the player with the operation member;

c) signal generation member for generating an input signal;

d) closed loop means, including delay means and filter means, for receiving said input signal and generating a musical tone signal by circulating said input signal in said closed loop means, the delay means delaying a signal inputted therein and the filter means filtering a signal passed therethrough; and e) control means for controlling a frequency characteristic of said filter means in said loop means according to said musical performance detected by said detecting means;

wherein said operation member includes a rod-like member to be operated by a player, and said detecting means detects a moving amount and a pressure amount exerted on the rod-like member by the player as the musical performance.

17. An electronic musical instrument comprising:

a) an operation member to be operated by a player;

b) detecting means for detecting a musical performance operated by the player of the operation member;

c) signal generation member for generating an input signal;

d) closed loop means, including delay means, for receiving said input signal and generating a musical tone signal therefrom by circulating said input signal in said closed loop means; and e) control means for controlling weakening of the musical tone signal as said input signal circulates in said loop means, and said weakening of the musical tone signal is controlled in response to said musical performance detected by said detecting means;

wherein said operation member includes a rod-like member to be operated by a player, and said detecting means detects a moving amount and a pressure amount exerted on the rod-like member by the player as the musical performance.

18. An electronic musical instrument comprising:

a) an operation member to be operated by a player;

b) detecting means for detecting a musical performance operated by the player with the operation member;

c) closed loop means, including delay means, for receiving an input signal and generating a musical tone signal by circulating said input signal in said closed loop means, the delay means delaying a signal inputted thereto; and d) signal generation member for receiving a signal corresponding to the detected musical performance and a signal extracted from said closed loop means and for generating the input signal in response to the received signals, wherein a non-linear characteristic between the received signal and the input signal is controlled in response to said musical performance detected by said detecting means in real time;

wherein said operation member includes a rod-like member to be operated by a player, and said detecting means detects a moving amount and a pressure amount exerted on the rod-like member by the player as the musical performance.

* * * * *